United States Patent
Kim et al.

(10) Patent No.: US 12,522,275 B2
(45) Date of Patent: Jan. 13, 2026

(54) STEERING WHEEL AND METHOD OF MANUFACTURING SAME

(71) Applicant: Autoliv Development AB, Vargarda (SE)

(72) Inventors: Jinkeun Kim, Kanagawa (JP); Gurudatt Chattaraki, Kanagawa (JP); Marudhu Pandi, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 77 days.

(21) Appl. No.: 18/250,681

(22) PCT Filed: Oct. 12, 2021

(86) PCT No.: PCT/JP2021/037696
§ 371 (c)(1),
(2) Date: Apr. 26, 2023

(87) PCT Pub. No.: WO2022/091768
PCT Pub. Date: May 5, 2022

(65) Prior Publication Data
US 2023/0406252 A1    Dec. 21, 2023

(30) Foreign Application Priority Data

Oct. 26, 2020    (JP) ................................. 2020-179066

(51) Int. Cl.
*B62D 1/04*    (2006.01)
*B60R 21/203*    (2006.01)
(Continued)

(52) U.S. Cl.
CPC ............ *B62D 1/04* (2013.01); *B60R 21/2037* (2013.01); *B62D 7/222* (2013.01); *F16B 21/186* (2013.01)

(58) Field of Classification Search
CPC ...... B62D 1/04; B62D 7/222; B60R 21/2037; B60R 21/203; B60R 21/2023; F16B 21/186; F16B 5/0664; B60Y 2400/83
See application file for complete search history.

(56) References Cited

U.S. PATENT DOCUMENTS 8,500,156 B2 *   8/2013   Banno ................. B60R 21/2037
                                                   280/728.2
2017/0349202 A1 * 12/2017   Banno ...................... B62D 1/08
(Continued)

FOREIGN PATENT DOCUMENTS

CN    207943015 U    10/2018
JP    2007-50876 A    3/2007
(Continued)

OTHER PUBLICATIONS

Espace translation of WO 2016 158503 A1 (Year: 2016).*

*Primary Examiner* — Jason D Shanske
*Assistant Examiner* — Scott Lawrence Strickler
(74) *Attorney, Agent, or Firm* — Matthew D. Thayne; Thayne and Davis LLC

(57) ABSTRACT

A steering wheel having a retaining spring has a pin engagement section that engages with a pin of an airbag module that is positioned inside a mounting hole to install the airbag module on a core bar. A base section of the core bar is provided with a spring mounting section to which the retaining spring is mounted. The spring mounting section includes a main body column section that protrudes from a base surface of the base section and an extension, a base end thereof connected to the main body column section and extending from the main body column section. A mounting section of the retaining spring is positioned between the base surface and the extension and mounted so as to sandwich the main body column section.

16 Claims, 13 Drawing Sheets

(51) Int. Cl.
*B62D 7/22* (2006.01)
*F16B 21/18* (2006.01)

(56) References Cited

U.S. PATENT DOCUMENTS

2020/0043679 A1* 2/2020 Nonoyama .............. B62D 1/04
2021/0269080 A1* 9/2021 Kim ........................ B62D 1/10

FOREIGN PATENT DOCUMENTS

| JP | 2010-69934 A | 4/2010 | |
|---|---|---|---|
| JP | 2012-071803 A | 4/2012 | |
| JP | 2020-019379 A | 2/2020 | |
| WO | WO-2016158503 A1 * | 10/2016 | ........... B60R 21/203 |
| WO | 2020/003777 A1 | 1/2020 | |

* cited by examiner

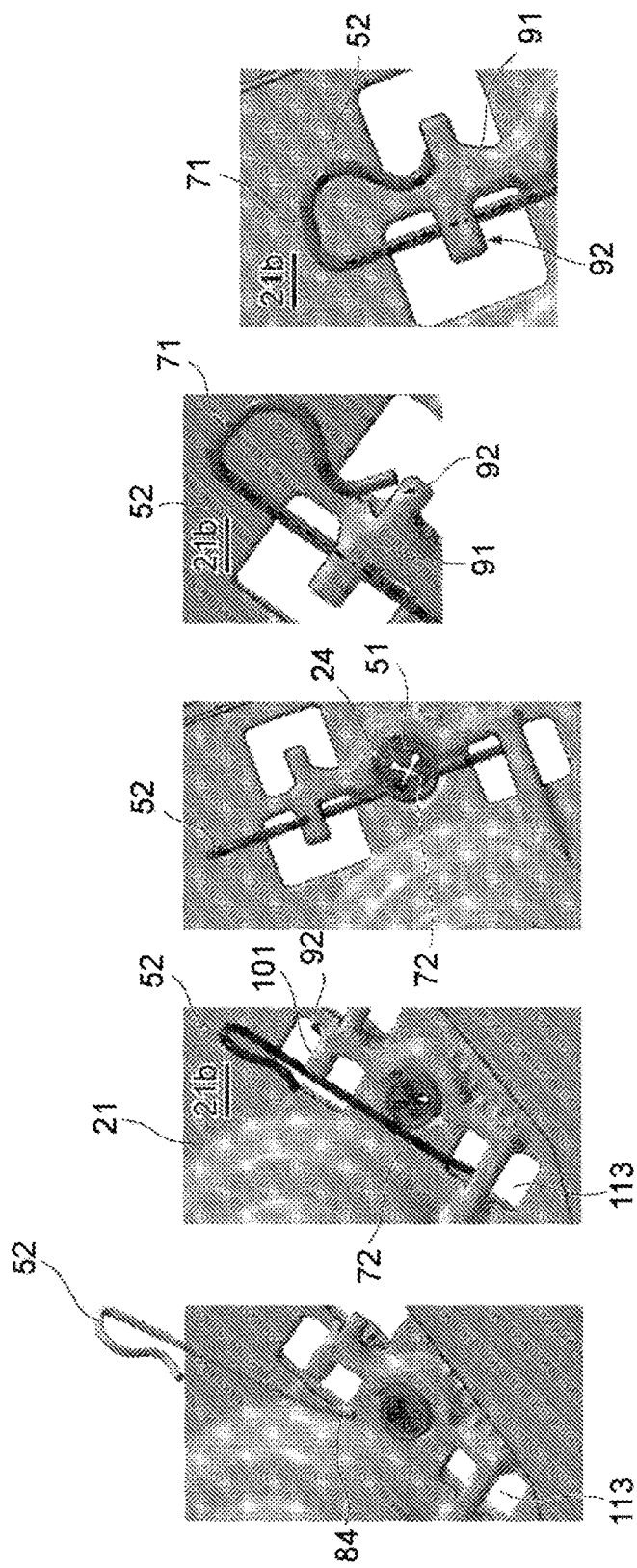

STEERING WHEEL AND METHOD OF MANUFACTURING SAME

TECHNICAL FIELD

The present invention relates to a steering wheel and to a manufacturing method thereof.

BACKGROUND ART

A one touch mounting mechanism such as a snap fit mechanism for assembling an airbag module to a core bar of a steering wheel is known for a steering wheel mounted in a vehicle (see, for example, Patent Documents 1 and 2). In this type of structure, a pin is provided in the airbag module, and a retaining spring (wire-shaped spring) is attached to the core bar. Furthermore, the pin of the airbag module is inserted into the pin hole of the core bar and engaged with the retaining spring.

For example, in Patent Document 1, a convex step section is formed in a base section of a core bar, a spring insertion hole is formed in the convex step section, the retaining spring is inserted into the spring insertion hole, and a pin of an airbag module is engaged at an intermediate section in a longitudinal direction of the retaining spring. Both sides of the retaining spring in the longitudinal direction protrude from the spring insertion hole, and the protruding portion is engaged with a rib, a protrusion, or the like, whereby the retaining spring is retained in the spring insertion hole (see paragraph 0047 of the same document).

RELATED ART DOCUMENTS

Patent Documents

Patent Document 1: Japanese Unexamined Patent Application 2007-50876
Patent Document 2: Japanese Unexamined Patent Application 2010-69934

SUMMARY OF THE INVENTION

Problem to be Solved by the Invention

While driving the vehicle, vibrations from the vehicle are transmitted to the steering wheel. On this point, in Patent Document 1, depending on a retention aspect of the retaining spring in the spring insertion hole, vibration from the vehicle may readily be transmitted. In addition, mounting the retaining spring may be complicated.

An object of the present invention is to provide a steering wheel that can reduce the effect of vibration on a retaining spring and that takes into consideration the mountability thereof, as well as a method of manufacturing thereof.

Means to Solve the Problem

A steering wheel according to an aspect of the present invention includes:
a core bar including a base section having a boss section and a mounting hole, a rim section, and a spoke section connecting the boss section or base section and the rim section;
an airbag module having a pin inserted into the mounting hole;
a retaining spring having a mounting section attached to the base section, and a pin engagement section positioned in the mounting hole to engage with the pin so that the airbag module is mounted on the core bar; wherein
the base section is provided with a spring mounting section to which the retaining spring is attached,
the spring mounting section includes a main body column section protruding from a base surface of the base section, and an extension having a base end continuous with the main body column section, and which extends from the main body column section,
the mounting section of the retaining spring is positioned between the base surface and the extension and attached so as to sandwich the main body column section,
the extension constitutes release preventing means of the retaining spring from the mounting section, and
the extension leading side is not connected to the base section.

According to this aspect, with the airbag module installed on the core bar, the pin of the airbag module is positioned in the mounting hole of the core bar and engages with the pin engagement section of the retaining spring. The retaining spring is mounted in a state on the spring mounting section of the core bar base section in a manner preventing retraction from the mounting section. Since the leading side of the spring mounting section extension configured to prevent retraction is not connected to the base section, vibration from the base section is not directly input to the leading side of the extension. Therefore, the effect of vibration on the retaining spring can be reduced by means of the section for preventing retraction (extension). In addition, this type of gap between the leading side of the extension and the base section due to not being connected contributes to weight reduction of the core bar base section and also contributes to improving attachability of the retaining spring. For example, use of the gap described above for mounting the retaining spring may be feasible.

In one aspect of the present invention, the extension includes a first section that extends to a first side of the main body column section and a second section that extends to a second side of the main body column section while each of the leading sides of the first section and the second section are not connected with the base section.

This aspect enables a configuration preventing retraction of the retaining spring on both sides (first side and second side) of the main body column section. Thereby, reducing the effect of vibration while improving retraction prevention of the retaining spring can be achieved.

In an aspect of the present invention, the distance between the leading side of the first section and the leading side of the second section in a direction perpendicular to the longitudinal direction of the main body column section is larger than the maximum width of the mounting section in the same direction. In addition, in another aspect, the leading side of the first section and the leading side of the second section may be positioned outside the mounting section as viewed from the main body column section.

With this type of aspect, the mounting section of the retaining spring can be opposed to at least a portion of the first section and the second section of the extension, constituting retraction prevention.

In an aspect of the present invention, a gap between the leading side of the first section and the base section opposed in a non-connected state and a gap between the leading side of the second section and the base section opposed in a non-connected state may both be larger than the wire diameter of the retaining spring.

According to this aspect, when the retaining spring is mounted, the retaining spring can pass through one or both of the gaps. Therefore, the attachability of the retaining spring is improved.

In an aspect of the present invention, at least one of the first section or the second section may extend in a direction orthogonal to the longitudinal direction of the main body column section.

This aspect enables achieving a configuration for preventing retraction from the mounting section of the retaining spring mounted so as to sandwich the main body column section in a direction orthogonal to the longitudinal direction of the main body column section. Therefore, retraction prevention can be improved.

In this case, the first section and the second section may be offset in the longitudinal direction of the main body column section.

This aspect can enable a configuration preventing retraction by means of the first section and second section of the extension to provide a step change in a direction orthogonal to the longitudinal direction of the main body column section. Thereby, retraction prevention can be improved.

In an aspect of the present invention, at least one of the size or length of the first section and the second section are mutually different.

This aspect enables increasing the degree of freedom of design of each section of the extension.

In an aspect of the present invention, the base section may have openings respectively positioned opposite the leading side of the first section and the leading side of the second section.

This aspect enables weight reduction of the base section.

In an aspect of the present invention, the retaining spring may have a straight line section that extends linearly, the mounting section may have a U shaped section with a first end connected to the straight line section, and a portion of the straight line section may constitute the pin engagement section.

In addition, the mounting section of the retaining spring may extend from a second end of the U shaped section in a direction approaching the straight line section and also may include a curved section extending in a direction away from the straight line section, and the main body column section may include a side section bent to receive the curved section.

According to this aspect, the curved section of the retaining spring receives the side section of the main body column section so mounting of the retaining spring to the spring mounting section is strengthened.

In an aspect of the present invention the steering wheel may include:
a retaining member mounted in the mounting hole, wherein
the retaining member is arranged in the mounting hole and includes a cylindrical section in which the pin is inserted, and a notched section formed in the cylindrical section, and
the pin engagement section is positioned inside the cylindrical section via the notched section and engages with the pin.

According to an aspect of the present invention, a method of manufacturing a steering wheel including: a core bar having a boss section and a base section with a mounting hole and a spring mounting section, a rim section, and a spoke section connected to the rim section and the boss section or the base section; the spring mounting section including: a main body column section protruding from a base surface of the base section and an extension connected to the main body column section and extending from the main body column section;

comprises:
a step of molding a back cover of resin material on a back side of the core bar where the leading side of the extension is not connected with the base section;
a step of attaching a retaining spring to the back side of the core bar to which a back cover was molded, including: positioning the mounting section of the retaining spring between the base surface and the extension, attaching the spring mounting section so as to sandwich the main body column section, providing a configuration to prevent retraction of the retaining spring from the mounting section, and positioning the pin engagement section of the retaining spring in the mounting hole; and
a step of assembling an airbag module to the front side of the core bar, including: inserting a pin provided on the airbag module into the mounting hole and engaging the pin with the pin engagement section of the retaining spring.

According to this aspect, similar to that described above, in a manufactured steering wheel, the leading side of the extension configured to prevent retraction of the retaining spring is not connected to the base section so the effect of vibration on the retaining spring via the section for preventing retraction can be reduced. In addition, the gap generated based on not being connected can improve weight reduction of the core bar base section and attachability of the retaining spring. In particular, this enables mounting the retaining spring after molding the back cover which is beneficial in the manufacturing process of the steering wheel.

BRIEF DESCRIPTION OF THE DRAWINGS

FIG. 13 is a view illustrating the process flow of mounting the retaining spring to the back side of the core bar.

DESCRIPTION OF THE PREFERRED EMBODIMENTS

A steering wheel according to a preferred embodiment of the present invention will be described.

The steering wheel is arranged on the driver seat side of a vehicle such as an automobile, and has a plurality of functions. For example, the steering wheel functions as a vehicle steering device. Specifically, the steering wheel is generally attached in an inclined state to an upper end section of a steering shaft provided on a vehicle body. Steering force from the driver is transmitted from the steering wheel to the steering shaft, and transmitted to wheels via a steering gear or the like, thereby changing the direction of the wheels.

In addition, the steering wheel also functions as a front airbag in the event of a vehicle emergency. An example of a vehicle emergency is a time when a vehicle collision occurs. The steering wheel functioning as a front airbag is mainly achieved by an airbag module installed on the core bar of the steering wheel. In addition to these functions, the steering wheel may also function as a horn device and as a dynamic damper that dampens vibrations transferred from the vehicle to the steering wheel. A function as a dynamic damper is achieved, for example, by a damper unit provided between the airbag module and the core bar.

In the following, for convenience of explanation, the three axes of XYZ are defined as follows. The axial direction of the steering shaft is defined as the "Z-axis direction," the direction connecting 9 o'clock and 3 o'clock on an analog 12-hour clock on a plane perpendicular to the Z-axis direction is defined as the "X-axis direction," and the direction connecting 12 o'clock and 6 o'clock on the same clock is defined as the "Y-axis direction." The X-axis direction can be a direction corresponding to the width direction of the steering wheel or vehicle. A plane defined by the X-axis and the Y-axis is called an "XY plane". In the Z-axis direction, the Z-axis first direction is directed toward the lower end part of the steering shaft, and the Z-axis second direction is directed toward the upper end part of the steering shaft (toward the driver). In addition, a first direction of the Z-axis faces the back side of the core bar, and a second direction of the Z-axis faces the front side of the core bar.

Figure 1:
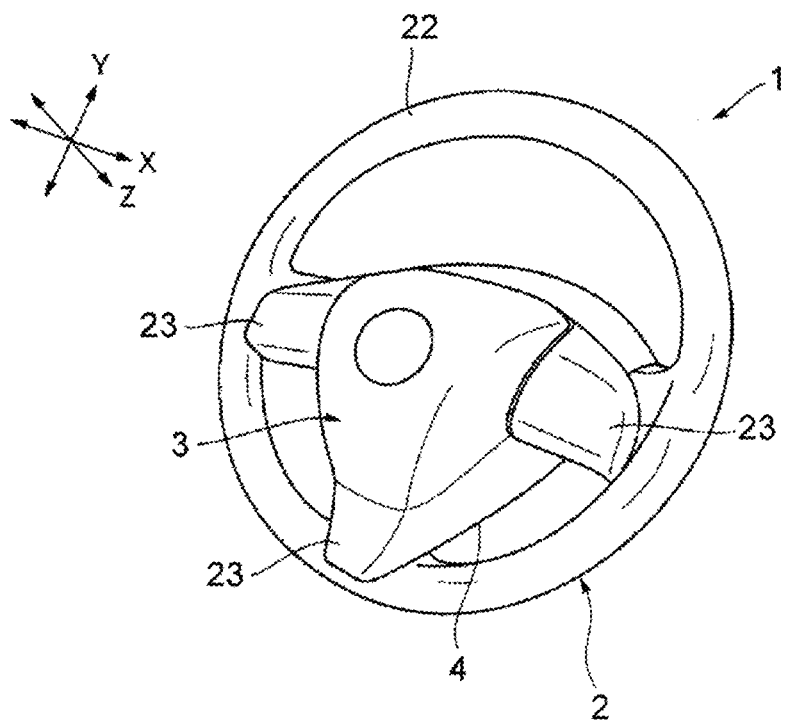
FIG. 1 is a perspective view illustrating the appearance of a steering wheel according to an embodiment.
Figure 2:
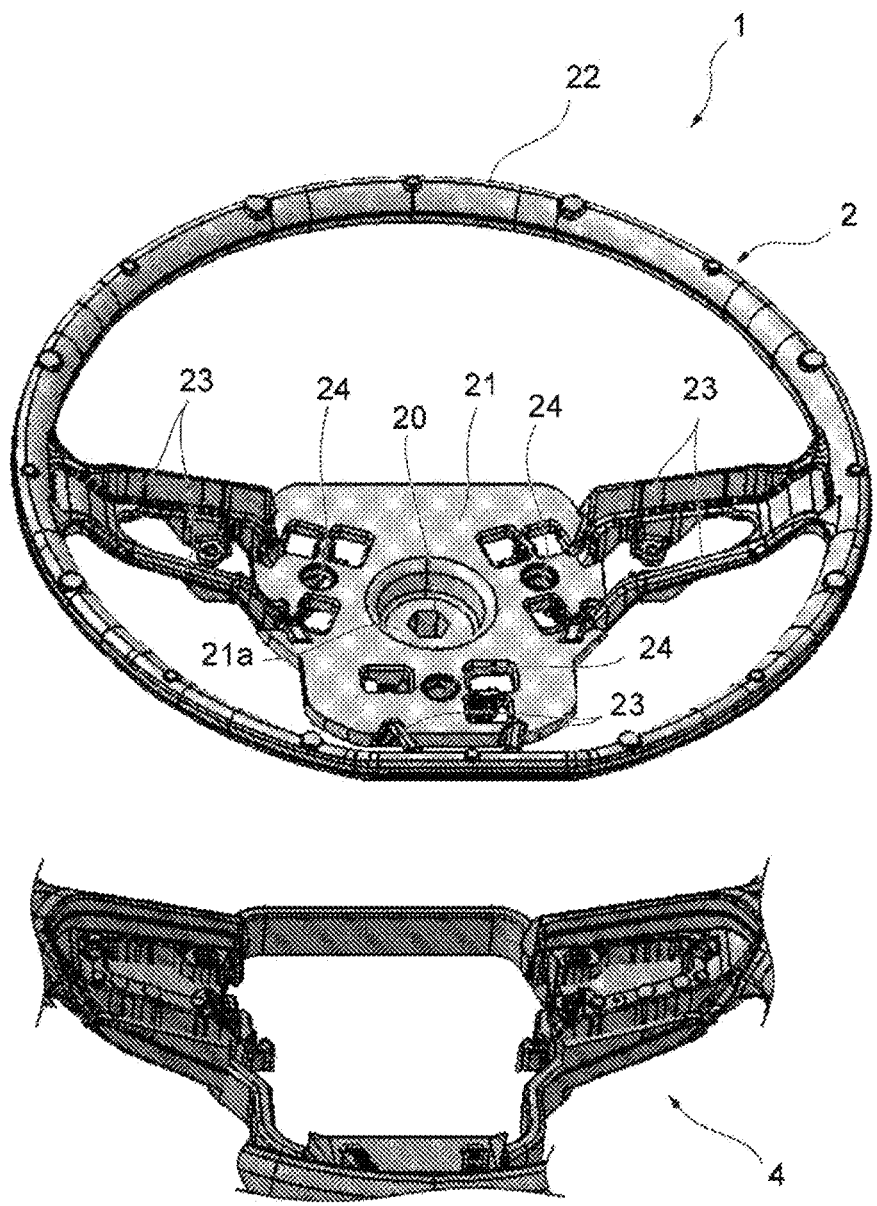
FIG. 2 is a front perspective view illustrating the steering wheel according to the embodiment with the core bar and the back cover disassembled and the airbag module omitted.

As illustrated in FIGS. 1 and 2, a steering wheel 1 has a core bar 2 and an airbag module 3. The airbag module 3 is assembled to the center of the front side of the core bar 2. A back cover 4 is provided on the back side of the core bar 2.

The core bar 2 constitutes a framework of the steering wheel 1 and forms the shape of the steering wheel 1. The core bar 2 includes a base section 21 having a center boss section 20, an annular rim section 22 gripped by the driver, and spoke sections 23 connecting the boss section 20 or the base section 21 and the rim section 22. The boss section 20 is connected to the steering shaft. The base section 21 is a section including the boss section 20 in the center, and has a plurality of (here, three) mounting holes 24, 24, 24 on a peripheral portion of the boss section 20 for mounting the airbag module 3. The mounting holes 24 penetrate the base section 21. There are three spoke sections 23, which extend in three directions from the base section 21 and are connected to the rim section 22 on the outer circumference of the steering wheel 1.

The core bar 2 is composed of, for example, metal such as iron, aluminum, or magnesium, resin, or the like. The core bar 2 is provided with a layer of soft synthetic resin coating such as foamed polyurethane resin so as to partially or wholly cover the core bar. There may be a plurality of layers for this type of layer. For example, a urethane layer as an insulating layer, a heater electrode layer for a heater function to warm the steering wheel 1, a skin layer as an insulating layer, and a sensor electrode for detecting gripping of the steering wheel 1 by the driver, may be sequentially arranged in the direction facing outward from the core bar 2.

The back cover 4 covers a portion of the core metal 2 from the back side of the core bar 2. For example, the back cover 4 covers the peripheral portion of the boss section 20 and the spoke sections 23 on the back side of the core bar 2 so that the boss 20 and the spoke sections 23 of the core 2 cannot be seen from the outside (driver). The back cover 4 is molded using a resin material. For example, the back cover 4 is molded from urethane. As will be described below, the back cover 4 is integrally formed on the back side of the core bar 2.

Figure 3:
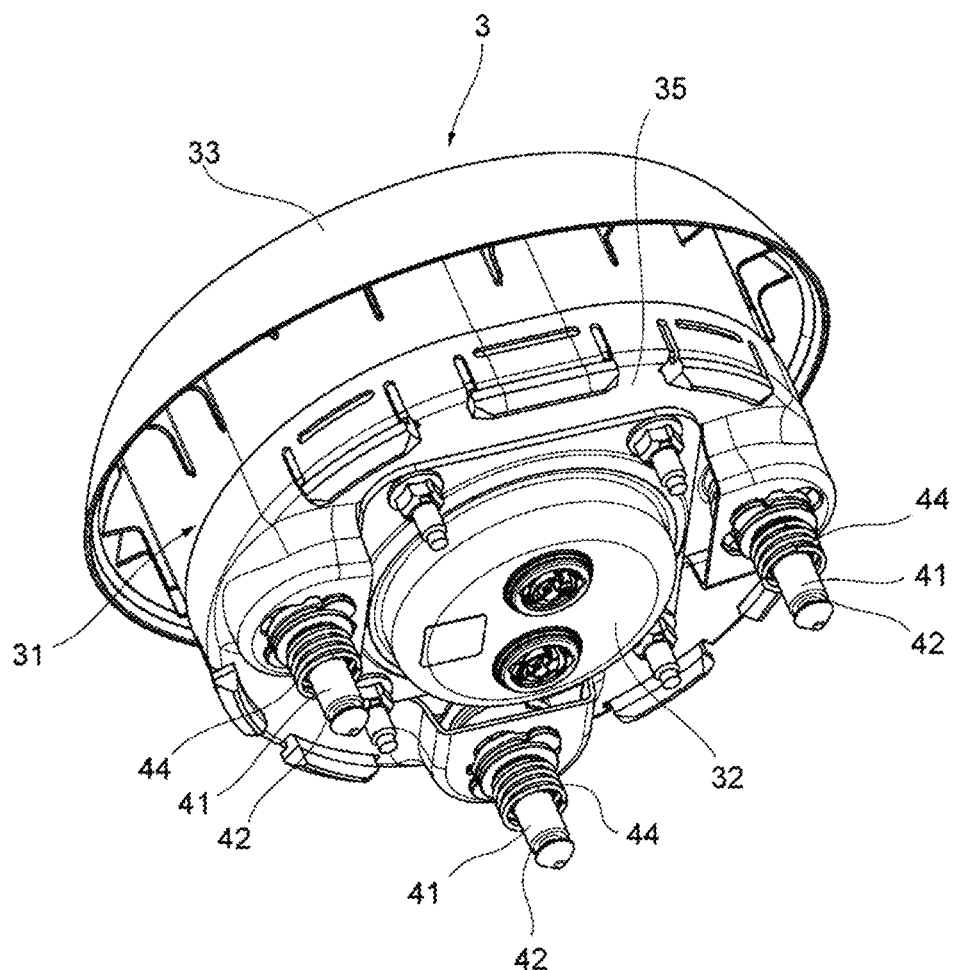
FIG. 3 is a perspective view illustrating the airbag module of the steering wheel according to the embodiment.

As illustrated in FIG. 3, the airbag module 3 includes a retainer 31 with a folded airbag cushion stowed therein, an inflator 32 supported by the retainer 31, and a module cover 33 for covering the folded airbag cushion and the inflator 32 from the driver's side.

The retainer 31, the inflator 32, and the module cover 33 can employ known configurations. For example, the retainer 31 mounts the inflator 32 in the center of a bottom surface 35 along the XY plane and the module cover 33 is attached with fasteners to a peripheral wall extending from the bottom surface 35. The inflator 32 has a low-profile hollow disc body with gas discharge holes. The module cover 33 can function as a horn switch pressed by the driver when sounding the horn. In the event of a vehicle emergency, the inflator 32 is activated upon receiving a signal from the vehicle sensors and supplies gas to the airbag cushion. The airbag cushion supplied with gas rapidly expands, ruptures the module cover 33, expands toward the driver's side of the vehicle interior space, and restrains the driver.

Figure 4:
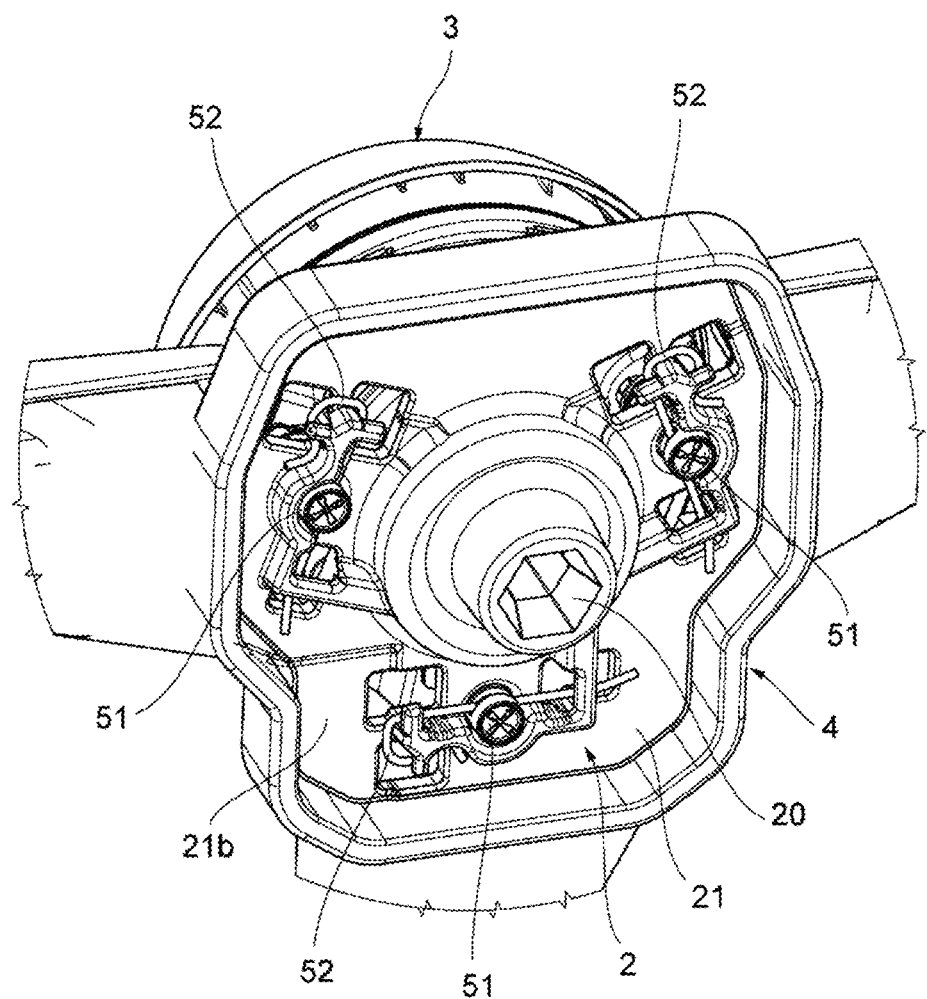
FIG. 4 is a perspective view illustrating the back side of the core bar of the steering wheel according to the embodiment.
Figure 5:
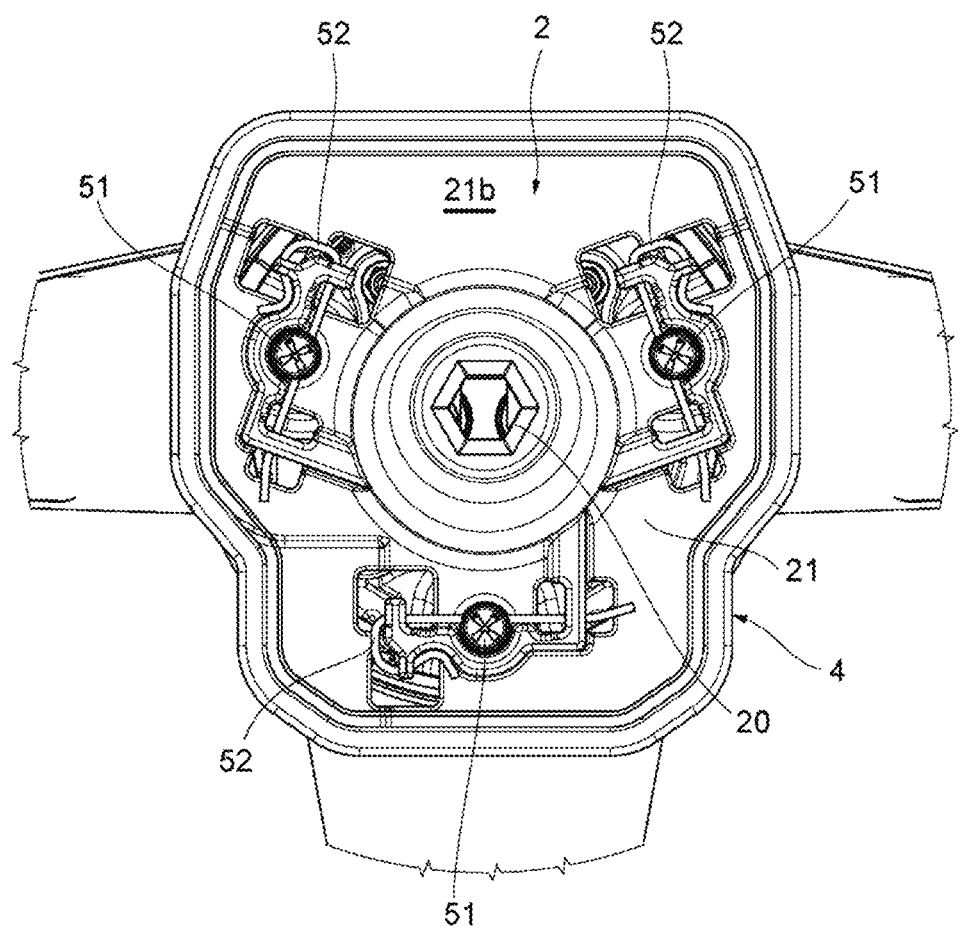
FIG. 5 is a bottom surface view of FIG. 4.

The airbag module 3 has a plurality (three in this case) of pins 41, 41, 41. The pins 41 are for connecting the airbag module 3 and the core bar 2. The three pins 41 are provided at positions corresponding to the three mounting holes 24 of the core bar 2. For example, the three pins 41 are arranged in the directions of 3 o'clock, 6 o'clock and 9 o'clock based on an analog 12-hour clock when the airbag module 3 is viewed on a plane perpendicular to the Z-axis direction. The pins 41 are provided so as to protrude from the bottom surface 35 of the retainer 31 in the Z-axis first direction (core bar 2 side), and can be inserted into the mounting holes 24 of the core bar 2. An engagement groove 42 is formed in the tip end part of the pin 41 in a direction orthogonal to the axial direction of the pin 41. The engagement groove 42 is annularly formed in the circumferential direction of the pin 41. The engagement groove 42 is engaged by a retaining spring 52 (see FIG. 4), which will be described below, when the airbag module 3 is attached to the core bar 2.

A coil spring 44 is provided on the base end side of the pin 41 so as to surround the outer circumference of the pin 41. A first end of the coil spring 44 is retained on the bottom surface 35 of the retainer 31, and a second end is free. When the airbag module 3 is assembled to the core bar 2, the second end of the coil spring 44 contacts the base section 21 of the core metal 2, and the retainer 31 is biased by the coil spring 44 in a direction away from the base section 21.

In this assembled state, the coil spring 44 allows the airbag module 3 to be displaced relative to the core bar 2 (especially to advance and retreat in the Z-axis direction). Therefore, the coil spring 44 can function as a damper unit regarding transmitting vibration of the core bar 2 from the vehicle body to the airbag module 3. In addition, the coil spring 44 provides an advantageous function in the case that the module cover 33 functions as a horn switch as well. For example, when the driver pushes the module cover 33 in the first direction of the Z-axis, the airbag module 3 approaches the base section 21 against the bias force of the coil spring 44. This provides electrical contact between the contact points on the airbag module 3 and the base section 21 enabling the horn to sound.

Figure 6:
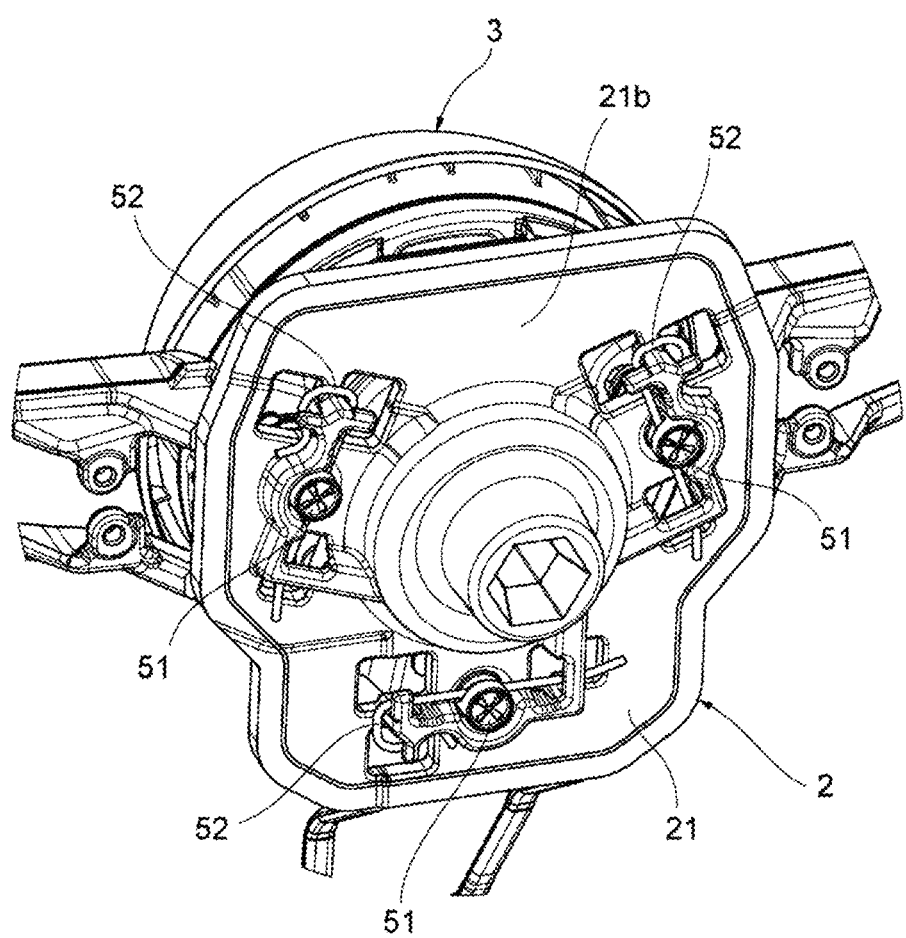
FIG. 6 is a perspective view illustrating the back side of the core bar of the steering wheel according to the embodiment, in which the back cover from FIG. 4 is omitted.
Figure 7:
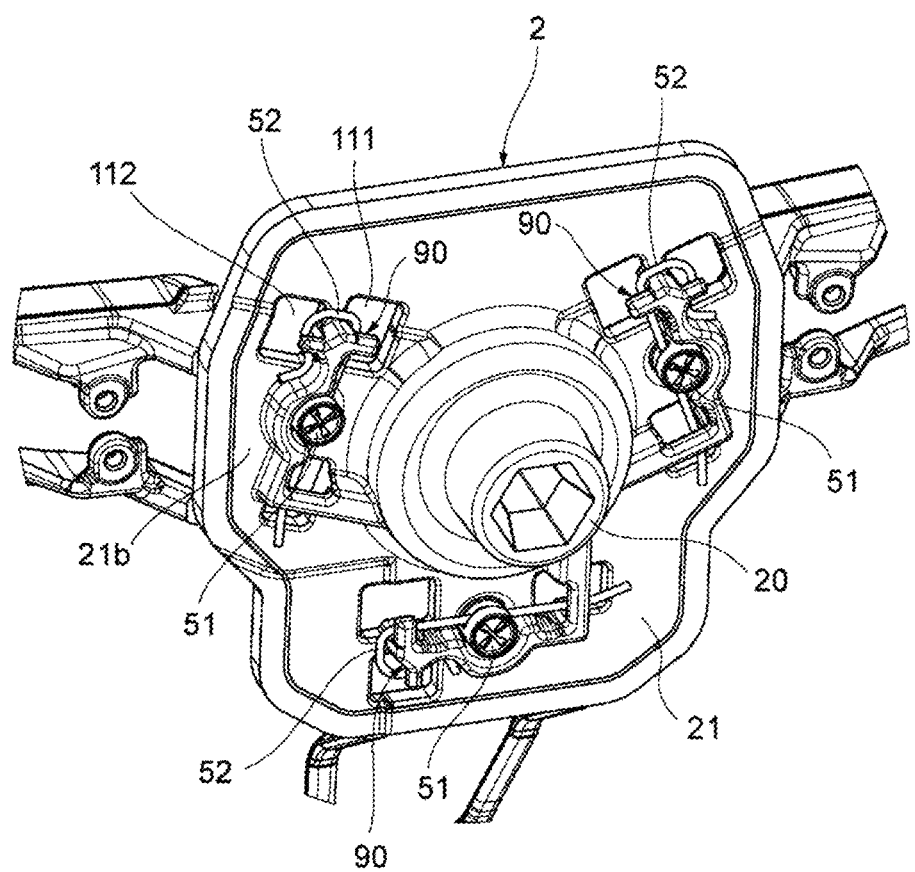
FIG. 7 is a perspective view illustrating the back side of the core bar of the steering wheel according to the embodiment, in which the airbag module from FIG. 6 is omitted.

FIGS. 4 to 7 illustrate the back side of the core bar 2. FIG. 6 is the diagram from FIG. 4 with the back cover 4 omitted, and FIG. 7 is the diagram from FIG. 6 with the airbag module 3 omitted. As illustrated in FIGS. 4 to 7, retaining members 51, 51, 51 are respectively attached to the mounting holes 24, 24, 24 of the base section 21 of the core bar 2. In addition, the retaining springs 52, 52, 52 are provided near the three mounting holes 24, 24, 24. When assembling the airbag module 3, each pin 41 of the airbag module 3 is inserted into the corresponding retaining member 51, and the engagement groove 42 of the pin 41 engages with the retaining spring 52.

Figure 8A:
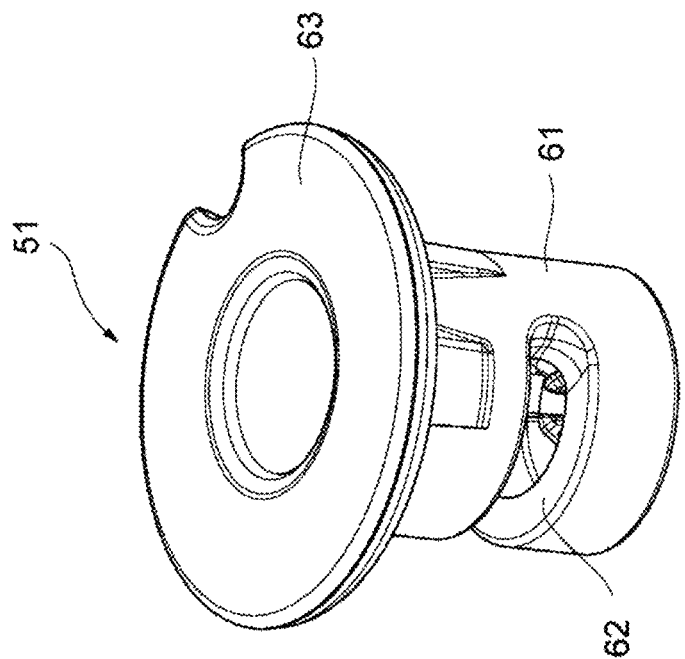
FIG. 8(A) is a perspective view of the retaining member viewed obliquely from below, and (B) is a perspective view of the retaining member viewed obliquely from above.
Figure 8B:
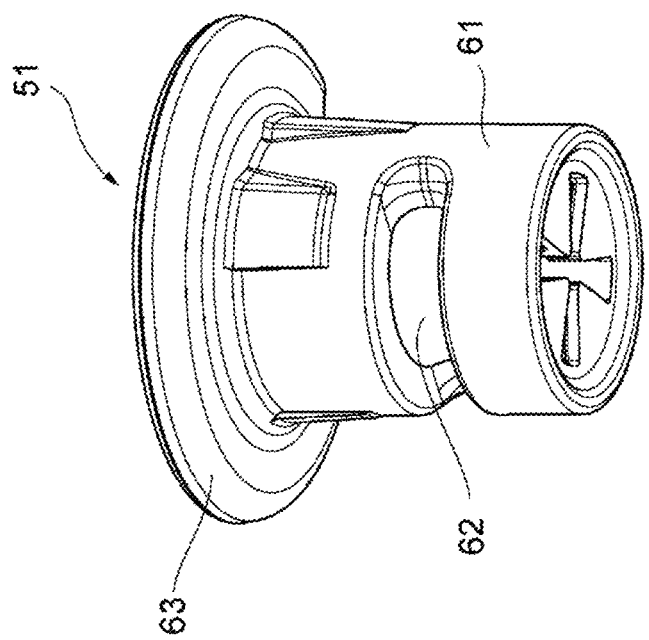

As illustrated in FIG. 8, the retaining member 51 has a cylindrical section 61 and a notched section 62 formed in the cylindrical section 61. The retaining member 51 also has a flange section 63 projecting in a ring shape from the outer peripheral surface on one end side of the cylindrical section 61. The retaining member 51 functions as a collar molded of synthetic resin, for example, and maintains the relative position or spacing between the pin 41 of the airbag module 3 and the mounting hole 24 of the core bar 2.

The cylindrical section 61 is arranged inside the mounting hole 24. The cylindrical section 61 is formed in a substantially cylindrical shape, and is configured to enable inserting the pin 41 therein. The notched section 62 connects the inside and the outside of the cylindrical section 61 and is formed by notching part way along the cylindrical section 61 in the axial direction. For example, the notched section 62 is notched through approximately half of the cylindrical section 61 in a direction orthogonal to the axial direction of the cylindrical section 61 and connects the inside and the outside of the cylindrical section 61 in a direction orthogonal to the axial direction of the cylindrical section 61. A flange section 63 is in contact with an opening edge of the mounting hole 24 (see FIG. 10(B)). Specifically, the flange section 63 is in contact with a surface 21*a* of the base section 21 on the surface side of the core bar 2 and prevents the retaining member 51 from pulling off the back side of the core bar 2 through the mounting hole 24.

Figure 9:
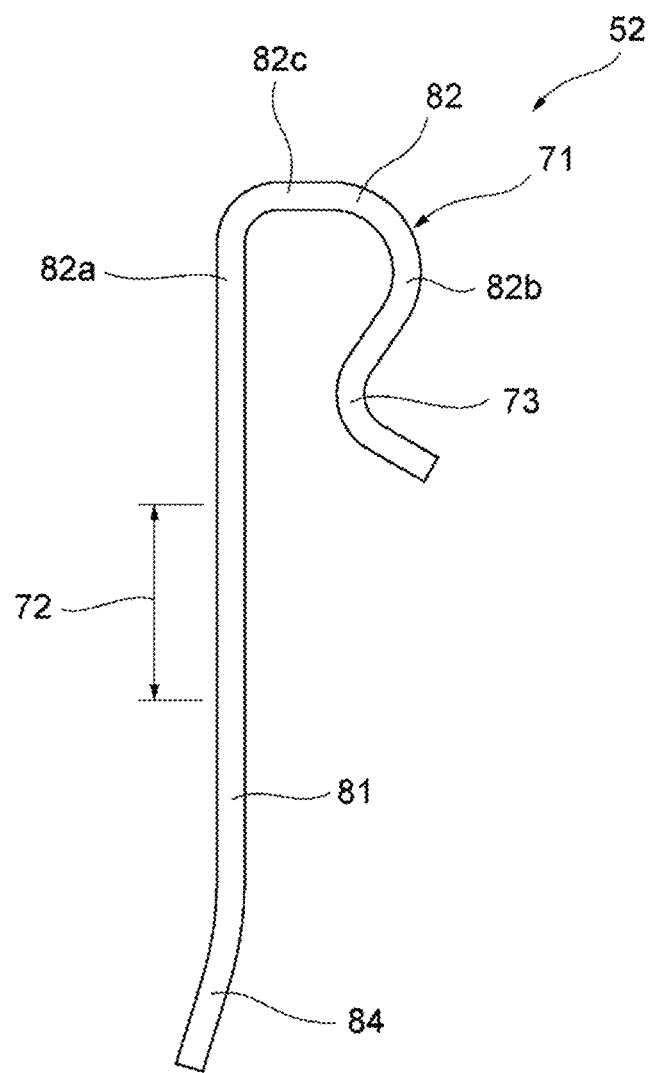
FIG. 9 is a plan view of a retaining spring.

As illustrated in FIG. 9, the retaining spring 52 is composed of a wire such as metal, for example, and is elastically deformable. The retaining spring 52 includes a mounting section 71 for mounting to the base section 21 of the core bar 2 and a pin engagement section 72 that engages with the pin 41 of the airbag module 3. The mounting section 71 includes a substantially U shaped section 82 and the pin engagement section 72 is composed of a straight line shaped section.

In addition, the retaining spring 52 includes a straight line section 81 that extends linearly. The mounting section 71 includes the substantially U shaped section 82 having a first end thereof connected to the straight line section 81, and a curved section 73 that extends from a second end of the substantially U shaped section 82. The straight line section 81 includes on the leading side thereof, an inclined section 84 inclined in a direction away from the curved section 73. A portion of the straight line section 81 constitutes the pin engagement section 72. Specifically, a portion of the straight line section 81 between the inclined section 84 and the mounting section 71 constitutes the pin engagement section 72.

The substantially U shaped section 82 of the mounting section 71 includes a first arm section 82*a* on the extension of the straight line section 81, a second arm section 82*b* opposite the first arm section 82*a*, and a connecting section 82*c* that connects the first arm section 82*a* and the second arm section 82*b*. The second arm section 82*b* curves toward the outside. The first arm section 82*a* and the second arm section 82*b* are mutually elastically deformable in a separating direction. The curved section 73 extends in a direction from the end section of the second arm section 82*b* approaching the straight line section 81 and thereafter extends in a direction separating from the straight line section 81. In other words, the curved section 73 is curved to the inside, opposite to the curve of the second arm section 82*b*.

The pin engagement section 72 includes an engagement groove 42 that can engage with the pin 41 of the airbag module 3. The pin engagement section 72 is positioned inside the cylindrical section 61 of the retaining member 51 via the notched section 62 of the retaining member 51 and engages with the pin 41. In the engaged state, a restoring force acts on the pin engagement section 72 preventing retraction of the pin 41. Specifically, in the engaged state, the pin engagement section 72 is pushed outwardly by the engagement groove 42. Here, the straight line section 81 with the pin engagement section 72 provided in the middle thereof is connected to the substantially U shaped section 82, so the restoring force acts on the pin engagement section 72. Thus, the pin engagement section 72 engages with the engagement groove 42 to install the airbag module 3 on the core bar 2.

Figure 10:
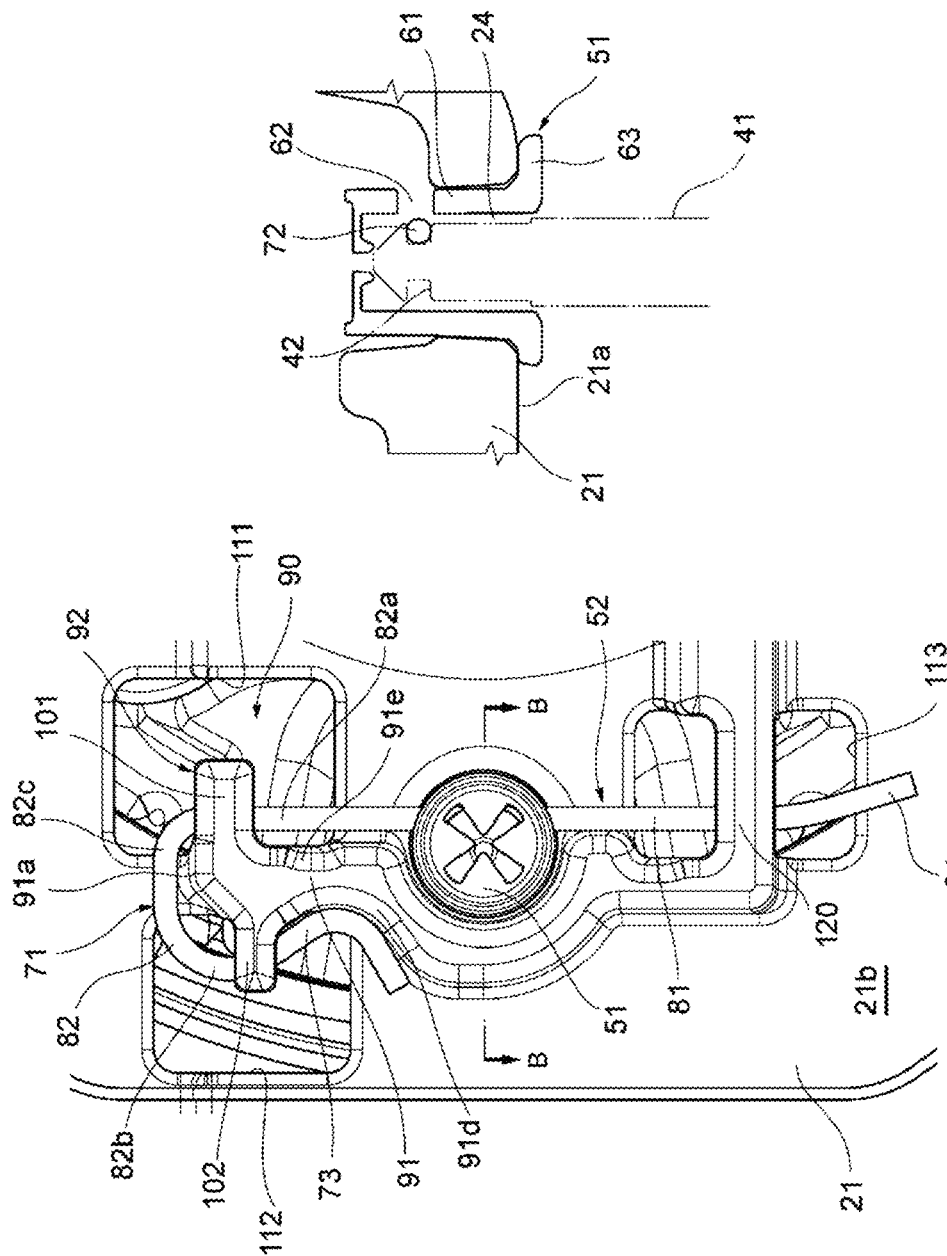
FIG. 10(A) is an enlarged view of FIG. 5 illustrating a spring mounting section in an enlarged manner, and (B) is an end view taken along line B-B of (A)

Next, a spring mounting section 90 that is mounted on the retaining spring 52 will be described with reference to FIG. 10. The spring mounting section 90 is provided on the base section 21 of the core bar 2. In detail, the spring mounting sections 90 are formed on the back side of the base section 21 near each of the mounting holes 24 (see FIG. 7).

The spring mounting section 90 includes a main body column section 91 protruding from the base surface 21*b* of the base section 21 and an extension 92 extending from the main body column section 91. The base surface 21*b* constitutes the back surface of the base section 21 and is formed so that the main body column section 91 and boss section 20 protrude further in the Z-axis first direction than the base surface 21*b* (see FIG. 7).

A mounting section 71 of the retaining spring 52 is mounted on the main body column section 91 so as to sandwich the leading side thereof. Specifically, the connecting section 82*c* of the mounting section 71 is in contact with a tip end surface 91*a* of the main body column section 91, the first arm section 82*a* and second arm section 82*b* of the mounting section 71 are in contact with or are facing both side surfaces of the leading sides of the main body column section 91, and the substantially U shaped section 82 is attached to the leading side of the main body column section 91.

In addition, the main body column section 91 includes a side section 91*d* curved to receive the curved section 73 of the mounting section 71 and a linear side section 91*e* on the opposite side of section 91*d*. The side section 91*d* is curved to the inside toward the side section 91e. When the substantially U shaped section 82 is attached to the leading side of the main body column section 91, the side section 91d contacts the curved section 73 and a portion of the straight line section 81 comes into contact with or faces the side section 91e. Herein, the curved section 73 is pushed outward by the side section 91d, a restoring force acts on the curved section 73, and the curved section 73 is pressed against the side section 91d. This prevents the retaining spring 52 from retracting in the longitudinal direction of the main body column section 91.

In another embodiment, not providing the curved section 73 or curved side section 91d is also feasible. For example, the mounting section 71 may utilize the substantially U shaped section 82 for mounting on the main body column section 91 to prevent retracting in the longitudinal direction of the main body column section 91.

The extension 92 includes a base end that is continuous with the main body column section 91 and a leading side that is not connected to the base section 21. Here, the extension 92 extends on the leading side of the main body column section 91 on both sides of the main body column section 91. Specifically, the extension 92 includes a first section 101 that extends to a first side of the main body column section 91 and a second section 102 that extends to a second side of the main body column section 91 while the leading sides of the first section 101 and the second section 102 are not connected with the base section 21.

The first section 101 and the second section 102 extend in a direction orthogonal to the longitudinal direction of the main body column section 91. In addition, the first section 101 and the second section 102 are offset in the longitudinal direction of the main body column section 91. Here, the first section 101 is positioned more to the leading side of the main body column section 91 than the second section 102.

In another embodiment, one or both of the first section 101 and the second section 102 may extend in a direction other than a direction orthogonal to the longitudinal direction of the main body column section 91. In addition, one of the first section 101 and the second section 102 may be omitted where the extension 92 would only extend from one side of the main body column section 91.

The first section 101 and the second section 102 extend from a portion of the main body column section 91 in the height direction forming a space for the retaining spring 52 between the first section 101 and second section 102 and the base surface 21b of the base section 21. For example, the first section 101 and second section 102 extend parallel to the base surface 21b from a portion of the main body column section 91 in the Z-axis first direction. Furthermore, a gap enabling positioning the mounting section 71 of the retaining spring 52 is formed between the base surface 21b and each of the lower surfaces of the first section 101 and the second section 102.

The first section 101 and the second section 102 constitute retraction prevention of the retaining spring 52 from the mounting section 71. For example, the first section 101 is positioned below (Z-axis first direction) the first arm section 82a of the mounting section 71, contacts the first arm section 82a, and constitutes retraction prevention of the retaining spring 52. In a similar manner, the second section 102 is positioned below (Z-axis first direction) the second arm section 82b of the mounting section 71, contacts the second arm section 82b, and constitutes retraction prevention of the retaining spring 52.

The shape, size, and dimensions of the first section 101 and the second section 102 were devised so as to constitute this type of retraction prevention. For example, the distances between the leading side of the first section 101 and the leading side of the second section 102 in the directions orthogonal to the longitudinal direction of the main body column section 91 are larger than the maximum width of the mounting section 71 in both directions. The maximum width of the mounting section 71 is the distance between the first arm section 82a and the outermost curved portion of the second arm section 82b. In addition, from another point of view, the leading side of the first section 101 and the leading side of the second section 102 can be said to be positioned to the outside of the mounting section 71, as viewed from the main body column section 91.

The gap between the leading side of the first section 101 and the base section 21 opposed thereto that is not connected and the gap between the leading side of the second section 102 and the base section 21 opposed thereto that is not connected are both larger than the wire diameter of the retaining spring 52. For example, the leading side of the first section 101 is separated from a portion of the base section 21 by more than the wire diameter of the retaining spring 52. In a similar manner, the leading side of the second section 102 is separated from a portion of the base section 21 by more than the wire diameter of the retaining spring 52. With this manner of dimensional settings, the retaining spring 52 can be caused to pass through the gaps when the retaining spring 52 is mounted.

At least one of the size and length of the first section 101 and the second section 102 are mutually different. For example, while slight, the first section 101 is thicker and longer than the second section 102. However, in another embodiment, the first section 101 and the second section 102 may be same size and the same length.

The base section 21 includes openings 111 and 112 respectively at positions opposite the leading side of the first section 101 and opposite the leading side of the second section 102. Here, the openings 111 and 112 are substantially rectangular openings and respectively oppose the entirety of the first section 101 and the second section 102. Therefore, the main body column section 91 protrudes from a portion of the base surface 21b between the opening 111 and the opening 112.

In addition, the base section 21 includes an opening 113 across the mounting hole 24 on the side opposite that of the opening 111. In a similar manner, the opening 113 is a substantially rectangular opening. The opening 113 faces a portion of the straight line section 81 (straight line section of straight line section 81, inclined section 84, and/or boundary between this straight line section and the inclined section 84) of the retaining spring 52. The end part (end part of inclined section 84) of the retaining spring 52 goes beyond the opening 113 and is positioned above the base surface 21b or faces the base surface 21b.

Note that the main body column section 91 includes a bridge section 120 extending to the opposite side of the tip end surface 91a and that extends in a direction orthogonal to the longitudinal direction of the main body column section 91 on the side opposite the tip end surface 91a. The bridge section 120 extends, for example, in the same direction as the first section 101 of the extension 92, passes over the opening 113, and is connected to the boss section 20. The bridge section 120 is configured so as to enable the straight line section 81 of the retaining spring 52 to pass therebelow (opening 113 side). In addition, the main body column section 91 is curved in a semicircular shape between the tip end surface 91a and the bridge section 120 on the second section 102 side of the extension 92 at a position corresponding to the mounting hole 24. However, in another embodiment, not providing this type of semicircular shaped curved section is feasible and the main body column section 91 not being provided with a portion extending linearly along the longitudinal direction is also feasible.

As described above, in a state with the retaining spring 52 mounted on the spring mounting section 90, the substantially U shaped section 82 of the mounting section 71 is mounted to the leading side of the main body column section 91, the curved section 73 of the mounting section 71 is received by the side section 91*d* of the main body column section 91, and a portion of the straight line section 81 is in contact with or faces the side section 91*e* of the main body column section 91. In this state, the first section 101 and the second section 102 of the extension 92 constitute retraction prevention of the retaining spring 52 from the mounting section 71. Note that the bridge section 120 constitutes retraction prevention of the retaining spring 52 from the straight line section 81. The pin engagement section 72 of the retaining spring 52 is inserted into the notched section 62 of the retaining member 51. In this state, the pin 41 of the airbag module 3 is inserted into the cylindrical section 61 of the retaining member 51, the pin 41 is elastically deformed by the pin engagement section 72, and the restoring force thereof causes the pin 41 to engage with the engagement groove 42.

Figure 11:
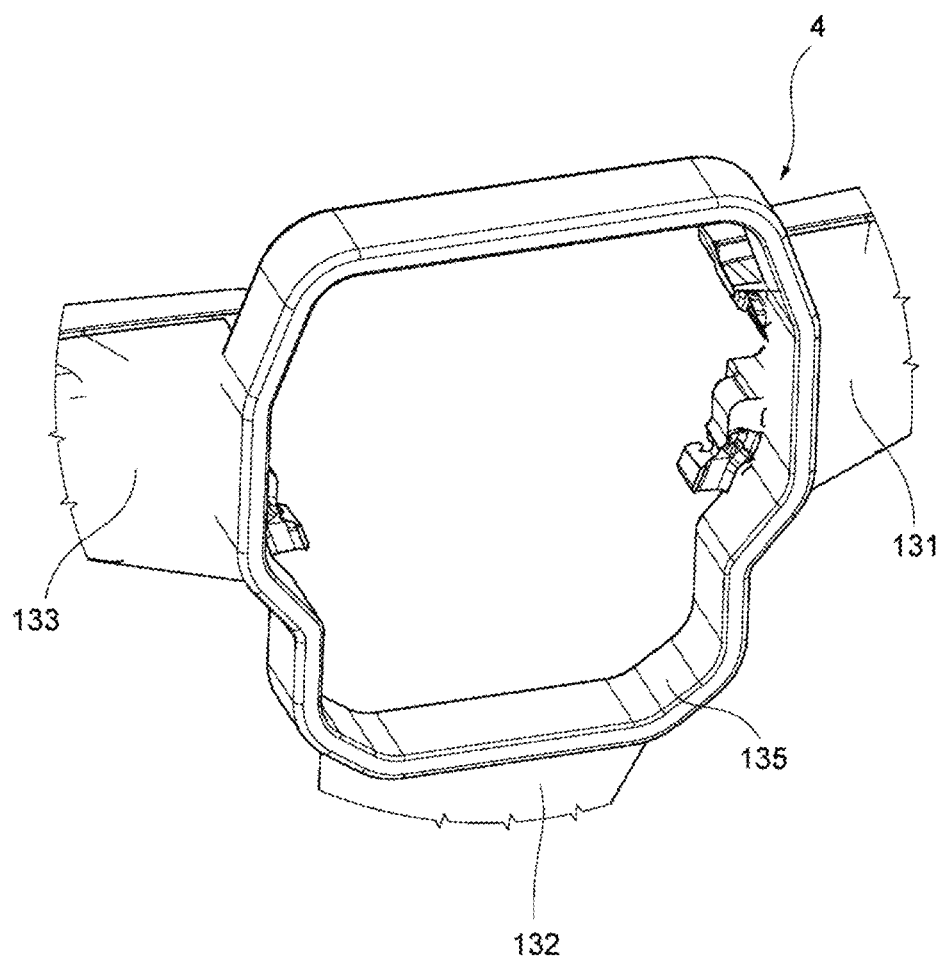
FIG. 11 is a perspective view illustrating the back side of the back cover of the steering wheel according to the embodiment.

Next, an example of a back cover 4 will be described with reference to FIG. 11. The back cover 4 is integrally molded to the back side of the core bar 2 and hides a portion of the core bar 2. For example, the back cover 4 includes spoke cover sections 131, 132, and 133 that cover the spoke sections 23 of the core bar 2. In addition, the back cover 4 includes a peripheral wall section 135 surrounding a peripheral edge of the core bar 2 base section 21. The peripheral wall section 135 rises from the peripheral edge of the base section 21 in the Z-axis first direction and the root portion thereof is connected to the spoke cover sections 131, 132, and 133.

Figure 12:
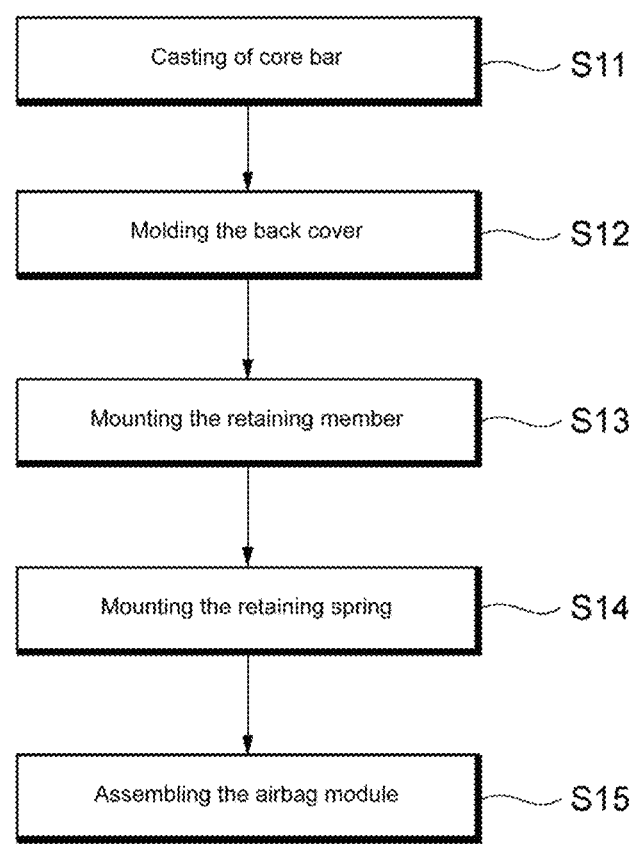
FIG. 12 is a flowchart illustrating the manufacturing method of the steering wheel according to the embodiment.

Next, a method of manufacturing the steering wheel 1 will be described with reference to FIG. 12. First, the core bar 2 is molded by casting (S11). Next, the back cover 4 is molded on the back side of the core bar 2 using resin material (S12). For example, the core bar 2 is set in a mold and then the back cover 4 is insert molded using urethane. Thus, the back cover 4 is integrally molded to the back side of the core bar 2. Next, the retaining member 51 is mounted to the mounting hole 24 of the core bar 2 (S13). Specifically, the cylindrical section 61 of the retaining member 51 is inserted into the mounting hole 24 from the front side of the core bar 2 and the flange section 63 comes into contact with the surface 21*a* of the base section 21.

Next, the retaining spring 52 is attached to the back side of the core bar 2 (S14). The flow of this example will be described with reference to FIG. 13. First, the end part (end part of inclined section 84) of the retaining spring 52 is directed toward the opening 113 (FIG. 13(A)) and inserted into the opening 113, and the retaining spring 52 is set in a horizontal orientation above the base surface 21*b* (FIG. 13(B)). As described above, the leading side of the extension 92 first section 101 is not connected to the base section 21, and the gap with the base section 21 is larger than the wire diameter of the retaining spring 52 so the retaining spring 52 can be passed through the gap and positioned above the base surface 21*b*.

Next, the retaining spring 52 is moved toward the mounting hole 24 and the pin engagement section 72 is inserted into the cylindrical section 61 of the retaining member 51 via the notched section 62 (FIG. 13(C)). As a result, the pin engagement section 72 is positioned inside the mounting hole 24. Next, the retaining spring 52 is rotated 90 degrees (FIG. 13(D)). Thereby, the mounting section 71 of the retaining spring 52 becomes positioned between the base surface 21*b* and the extension 92. Finally, the retaining spring 52 is moved horizontally above the base surface 21*b* (FIG. 13(E)), the mounting section 71 is mounted so as to sandwich the main body column section 91, and the extension 92 constitutes retraction prevention of the retaining spring 52 with respect to the mounting section 71. This completes the mounting steps (S14) for the retaining spring 52. In this manner of mounting process, the retaining spring 52 can be mounted in the center section of the core bar 2 even with the back cover 4 molded to the core bar 2.

Finally, the airbag module 3 is assembled to the front side of the core bar 2 (S15). Specifically, the core bar 2 with the retaining spring 52 mounted is inverted and the front side of the core bar 2 is caused to oppose the pin 41 of the airbag module 3. Based on the mounting form of the retaining spring 52 and the mounting form of the retaining member 51 described above, the retaining member 51 and retaining spring 52 will not drop from the core bar 2 even if the core bar 2 is inverted. The pin 41 of the airbag module 3 is inserted into the cylindrical section 61 in the mounting hole 24 and the pin engagement section 72 engages with the engagement groove 42. In other words, the pins are snap-fit. Thereby, the airbag module 3 is assembled to the core bar 2, and steering wheel 1 is manufactured.

As described above, with the steering wheel 1 according to this embodiment, the spring mounting section 90 to which the retaining spring 52 is attached is provided on the base section 21 of the core bar 2. The spring mounting section 90 includes a main body column section 91 that protrudes from a base surface 21*b* of the base section 21 and an extension 92, a base end thereof connected to the main body column section 91, and extending from the main body column section 91. A mounting section 71 of the retaining spring 52 is positioned between the base surface 21*b* and the extension 92 and mounted so as to sandwich the main body column section 91. The extension 92 is configured so as to prevent retraction of the retaining spring 52 from the mounting section 71 and the leading side of the extension 92 is not connected to the base section 21.

With this aspect, the leading side of the extension 92 of the spring mounting section 90 that constitutes the retraction prevention of the retaining spring 52 is not connected to the base section 21 so vibration is not directly input from the base section 21 to the leading side of the extension 92. Therefore, the effect of vibration on the retaining spring 52 can be reduced by means of the portion (extension 92) for retraction prevention. In addition, this manner of not being connected creates a gap between the leading side of the extension 92 and the base section 21 enabling weight reduction of the base section 21 and in addition contributes to improving attachability of the retaining spring 52. For example, this enables mounting the retaining spring 52 after molding the back cover 4 which is beneficial in the manufacturing process of the steering wheel 1.

The embodiment described above is for ease of understanding of the present invention and is not intended to be construed as limiting the present invention. Elements included in the embodiment, as well as arrangements, materials, conditions, shapes, sizes, and the like thereof, are not limited to those exemplified, but rather can be appropriately changed. For example, the retaining member 51 can be omitted.

DESCRIPTION OF CODES

1. Steering wheel; 2. Core bar; 3. Airbag module; 4. Back cover; 20. Boss section; 21. Base section; 21a. Surface; 21b. Base surface; 22. Rim; 23. Spoke section; 24. Mounting hole; 31. Retainer; 32. Inflator; 33. Module cover; 35. Bottom surface; 41. Pin; 42. Engagement groove; 44. Coil spring; 51. Retaining member; 52. Retaining spring; 61. Cylindrical section; 62. Notched section; 63. Flange section; 71. Mounting section; 72. Pin engagement section; 73. Curved section; 81. Straight line section; 82. Substantially U shaped section; 82a. First arm section; 82b. Second arm section; 82c. Connecting section; 84. Inclined section; 90. Spring mounting section; 91. Main body column section; 91a. Tip end surface; 91d, 91e. Side section; 92. Extension; 101. First section; 102. Second section; 111, 112, 113. Opening; 120. Bridge section; 131, 132, 133. Spoke cover section; 135. Peripheral wall section.

The invention claimed is:

1. A steering wheel, comprising:
a core bar including a base section having a boss section and a mounting hole, a rim section, and a spoke section connecting the boss section or base section and the rim section;
an airbag module having a pin inserted into the mounting hole;
a retaining spring having a mounting section attached to the base section, and a pin engagement section positioned in the mounting hole to engage with the pin so that the airbag module is mounted on the core bar; wherein
the base section is provided with a spring mounting section to which the retaining spring is attached,
the spring mounting section includes a main body column section protruding from a base surface of the base section, and an extension having a base end continuous with the main body column section and which extends from the main body column section, wherein the main body column section comprises a side section comprising a concave portion,
the mounting section of the retaining spring comprises a concave portion bent to receive the concave portion of the spring mounting section, wherein the mounting section of the retaining spring is configured to be positioned between the base surface and the extension and attached so as to sandwich the main body column section,
the extension constitutes release preventing means of the retaining spring from the mounting section, wherein the release preventing means of the retaining spring from the mounting section comprises a step change in a direction orthogonal to a longitudinal direction of the main body column section, and wherein the step change is provided by a first section and a second section being offset in the longitudinal direction of the main body column section, and
the extension leading side is not connected to the base section.

2. The steering wheel according to claim 1, wherein the extension includes the first section extending to a first side of the main body column section and the second section extending to a second side of the main body column section that is on the opposite side of the first side, and each leading side of the first section and the second section are not connected to the base section.

3. The steering wheel according to claim 2, wherein the distance between the leading side of the first section and the leading side of the second section in a direction perpendicular to the longitudinal direction of the main body column section is larger than the maximum width of the mounting section in the same direction.

4. The steering wheel according to claim 2, wherein the leading side of the first section and the leading side of the second section are both positioned to the outside of the mounting section as viewed from the main body column section.

5. The steering wheel according to claim 2, wherein a gap between the leading side of the first section and the base section opposed in a non-connected state and a gap between the leading side of the second section and the base section opposed in a non-connected state are both larger than the wire diameter of the retaining spring.

6. The steering wheel according to claim 2, wherein at least one of the first section and the second section extends in a direction perpendicular to the longitudinal direction of the main body column section.

7. The steering wheel according to claim 2, wherein at least one of the size and length of the first section and the second section are mutually different.

8. The steering wheel according to claim 2, wherein the base section includes openings respectively positioned facing the leading side of the first section and the leading side of the second section.

9. The steering wheel according to claim 1, wherein
the retaining spring includes a straight line section extending linearly,
the mounting section includes a substantially U shaped section with a first end connected to the straight line section, and
a portion of the straight line section constitutes the pin engagement section.

10. The steering wheel according to claim 9, wherein
the mounting section extends from a second end of the substantially U shaped section in a direction approaching the straight line section and also includes a curved section extending in a direction away from the straight line section, and
the side section is bent to receive the curved section.

11. The steering wheel according to claim 1, further comprising:
a retaining member mounted in the mounting hole, wherein
the retaining member is arranged in the mounting hole and includes a cylindrical section in which the pin is inserted, and a notched section formed in the cylindrical section, and
the pin engagement section is positioned inside the cylindrical section via the notched section and engages with the pin.

12. The steering wheel according to claim 1, wherein the mounting section of the retaining spring comprises a curved section, and wherein the main body column section comprises a side section bent to receive the curved section.

13. The steering wheel according to claim 12, wherein the side section comprises a curvature at least substantially matching a curvature of the curved section.

14. A method of manufacturing a steering wheel including: a core bar having a boss section and a base section with a mounting hole and a spring mounting section, a rim section, and a spoke section connected to the rim section and the boss section or the base section; the spring mounting section including: a main body column section protruding from a base surface of the base section and an extension connected to the main body column section and extending from the main body column section;

the method comprising:
- a step of molding a back cover of resin material on a back side of the core bar where the leading side of the extension is not connected with the base section;
- a step of attaching a retaining spring having a curved section to the back side of the core bar to which a back cover was molded, including: positioning the mounting section of the retaining spring between the base surface and the extension, wherein the extension includes a first section extending to a first side of the main body column section and a second section extending to a second side of the main body column section that is on the opposite side of the first side, attaching the spring mounting section by rotating the curved section so as to sandwich the main body column section, providing a configuration to prevent retraction of the retaining spring from the mounting section and inhibit interference between the curved section and the extension by way of the first section and the second section being offset in a longitudinal direction of the main body column section, and positioning the pin engagement section of the retaining spring in the mounting hole; and
- a step of assembling an airbag module to the front side of the core bar, including: inserting a pin provided on the airbag module into the mounting hole and engaging the pin with the pin engagement section of the retaining spring.

15. The method for manufacturing the steering wheel according to claim 14, wherein the back cover includes a peripheral wall section surrounding the peripheral edge of the base section.

16. The method for manufacturing the steering wheel according to claim 14, further comprising:
- a step of mounting in the mounting hole a retaining member having a cylindrical section provided in the mounting hole and a notched section formed in the cylindrical section, after the step of molding the back cover, wherein in the step of mounting the retaining spring to the back side of the core bar to which the back cover was molded, the pin engagement section of the retaining spring is inserted into the cylindrical section via the notched section, and in the step of assembling the airbag module on the front side of the core bar, the pin of the airbag module is inserted into the cylindrical section and is engaged with the pin engagement section of the retaining spring.

* * * * *